United States Patent [19]

McKeeman et al.

[11] Patent Number: 5,651,111

[45] Date of Patent: Jul. 22, 1997

[54] METHOD AND APPARATUS FOR PRODUCING A SOFTWARE TEST SYSTEM USING COMPLEMENTARY CODE TO RESOLVE EXTERNAL DEPENDENCIES

[75] Inventors: William M. McKeeman, Hollis; August G. Reinig, Hudson, both of N.H.

[73] Assignee: Digital Equipment Corporation, Maynard, Mass.

[21] Appl. No.: 587,253

[22] Filed: Jan. 16, 1996

Related U.S. Application Data

[63] Continuation of Ser. No. 255,138, Jun. 7, 1994, abandoned

[51] Int. Cl.$^6$ ............................. G06F 11/00; G06F 9/45
[52] U.S. Cl. ................. 395/183.14; 395/701; 364/275.5; 364/280.4
[58] Field of Search ..................... 395/183.01, 183.07, 395/183.14, 700; 364/275.5, 280.4

[56] References Cited

U.S. PATENT DOCUMENTS

| | | | |
|---|---|---|---|
| 4,595,981 | 6/1986 | Leung | 364/300 |
| 5,357,452 | 10/1994 | Pio-di-Savoia et al. | 364/579 |
| 5,359,546 | 10/1994 | Hayer et al. | 364/579 |

FOREIGN PATENT DOCUMENTS

0594888A1  10/1992  European Pat. Off. .

OTHER PUBLICATIONS

Wilde, Norman, "Testing Your Objects", The C Users Journal, May 1993.

DeMillo & Offutt, Constraint-Based Automatic Test Data Generation, IEEE Transactions on Software Engineering, Sep. 1991, at 900.

Hoffman, A CASE Study in Module Testing, 1989 Software Maintenance Conference, at 100.

Hoffman & Strooper, Automated Module Testing in Prolog, IEEE Transactions on Software Engineering, Sep. 1991, at 934.

DeMillo et al., Software Testing and Evaluation, Benjamin/Cummings Publishing Company, 1987.

Automator QA Programmer Reference Manual, by Direct Technology, 1991, Chapter 4.

Automator QA User Guide, by Direct Technology, 1991.

Automator QA Developer Guide with Examples, by Direct Technology, 1991.

*Primary Examiner*—Robert W. Beausoliel, Jr.
*Assistant Examiner*—Norman Wright
*Attorney, Agent, or Firm*—David A. Dagg; Denis G. Maloney; Arthur W. Fisher

[57] ABSTRACT

A software unit development and test methodology in which a software application or project is dividing into conceptual units. Each unit is first developed and debugged in an isolated testing environment which simulates the actual testing environment through test conditions. Following unit testing, other tested units are incrementally combined and tested in a similar isolated manner. Automatic generation of a testing environment and development system driving debugging and testing software, for measuring testing completeness, and for verifying correctness of future development and maintenance efforts are provided.

29 Claims, 4 Drawing Sheets

METHOD AND APPARATUS FOR PRODUCING A SOFTWARE TEST SYSTEM USING COMPLEMENTARY CODE TO RESOLVE EXTERNAL DEPENDENCIES

This application is a continuation, of application Ser. No. 08/255,138, filed Jun. 7, 1994 now abandoned.

FIELD OF THE INVENTION

The present invention generally relates to methods and apparatus for software testing and more specifically to providing automated generation of a testing development system to facilitate software debugging and testing in an isolated and controlled testing environment.

BACKGROUND OF THE INVENTION

Software testing is an ongoing task in computer software program development and maintenance which requires a large portion of development time, computer and human resources, and effort. Software development may include the development of an entirely new application or program, or the addition of a new feature to an existing application. Software maintenance activities generally include the correction of reported problems.

Testing is performed with the goal of verifying the correct functioning of new software and modifications to existing software. Generally, software testing accompanies even minor code modifications or enhancements to ensure correctness. Verifying the correctness of software may involve numerous tasks ranging from ensuring correct coding syntax through successful compilation, to checking the execution results by examining the output of a software program.

In order to test the execution of software, a machine-executable program comprising binary instructions and data in machine-readable form must be produced and executed. The software may be written in some high-level or low-level programming language. This software may be processed by a compiler, language processor, or translator to produce an object file containing binary or machine-readable code. Usually, there are multiple software modules or source files which comprise the software to be tested. Each of these software modules may be separately compiled, and a separate object file may be produced for each of these source files. These object files may be combined into a single machine-executable program using an operating system tool such as a linker which links together the multiple object files containing binary code and data to produce a single combined machine-executable program containing binary code and data. This machine-executable program may be run or executed on a computer system, and the results from the execution may be examined as a means to ensure correct functioning of the software.

Software programs vary in complexity and size. Both the small and simple programs as well as the large and more complex programs have a need for efficient software testing. Generally, as complexity and size increase, the amount of testing and the need for efficient testing increases as well.

Complex software programs may require development coordination effort due to scheduling dependencies of dependent software units and conflicting requirements for computer resources. For example, a software program may have certain functional components being developed in which each component requires the completion of multiple software units. To test a component requires the simultaneous completion of multiple software units. The total time required to test a component may be reduced by shortening the testing time required for the software units which comprise the component. In such a case, there tends to be a ripple effect of dependencies. By reducing the amount of testing time required for a critical software unit upon which other software units depend, the overall development time for a complex program may be reduced.

The development of a large software program is usually done by multiple developers. Generally, the testing methodology employed in such cases begins with individual developers testing their own code in unit testing. For example, each software component under development may comprise multiple software units each being completed by a different developer. Each developer successfully completes unit testing to verify the correctness of her own unit code independent of other newly developed code units. Unit testing typically follows a frequent iterative test-retest process. This test-retest process includes initially testing code, making code modifications or adding new test data, and then retesting the code.

A problem in performing unit testing arises due to external dependencies upon other untested code. Such external dependencies may prohibit a developer from successfully completing compiling and linking of the software unit which is being tested. For example, a code unit "A" may perform calls to routines in other code units "B" and "C". When "A" is unit tested, it is necessary to identify and resolve its dependencies on units "B" and "C" to successfully compile and link code unit "A" and obtain a machine-executable program which may be executed as part of unit testing "A". Thus, such external dependencies need to be resolved to successfully compile and link a code unit to be tested in order to obtain a machine-executable program. The machine-executable program may be executed to obtain test results which are examined to verify the correct execution of the software unit.

Following successful unit testing, integration testing may be performed. Integration testing comprises incrementally combining and testing multiple software units. For example, multiple software units comprising the software developed for a component may be combined in integration testing. Problems arise during integration testing which are similar to those which arise during unit testing. As software units are incrementally combined, the external dependencies may change. A developer may determine external dependencies through manual code inspection, compiling, or linking errors, and may resolve dependencies by a manual coding solution. This is time consuming and inefficient. Similar to unit testing, an efficient way of identifying and resolving these external dependencies is needed so that integration testing can be completed expeditiously and without undue difficulty.

Additionally, it is desirable to have consistency and uniformity in unit testing methods, test input data, and test results for ease and efficiency in the integration of software units and corresponding test data and results that may be combined as part of integration testing.

Similar software testing problems arise in the maintenance of existing software applications.

There is also a need in both new software development and software maintenance for an efficient way of verifying the correctness of a solution. Once one problem has been corrected, it is necessary to insure that no regressions occur as a result of further code modifications or additions. Regressions occur when new or modified code, for example, corrects one problem but causes other problems which did not exist prior to the addition of the new or modified code.

In order to minimize regressions, once the output from executing a set of software modules has been verified for given input data, it is desirable to use both the verified input data and corresponding output in subsequent testing to verify correctness.

A quantitative problem with testing all software is choosing appropriate metrics and an efficient means of obtaining the metrics to determine when testing is sufficient, and what additional tests may be needed for sufficient testing. Due to the variety of existing testing approaches, testing criteria, and methods, it may be difficult to determine an appropriate testing metric and an efficient technique for obtaining that metric. One metric used to measure the completeness of software testing is the number of lines of code of the software being tested which are executed for a given set of tests. This coverage analysis information enables determination of what lines of code have yet to be exercised to insure sufficiently complete testing. Full statement coverage is when all lines of code have been executed for a given set of tests.

Another related metric for measuring testing completeness is to measure branch coverage for source statements with multiple code paths depending on runtime evaluation of a condition. Specifically, branch coverage is measuring, for a given set of tests, the different code paths exercised in relation to all possible branch alternatives or code paths.

When debugging software, it is typically desirable to have a customizable testing environment allowing a developer to perform data validation for specific routines and parameters being tested, and providing a means for supplying data to drive routines.

It is desirable to provide a system and apparatus for testing software that overcomes the foregoing and other disadvantages of software testing techniques and problems, and which further provide a more efficient means of testing software, insure higher quality software due to more complete and sufficient testing, and save software development time and computer resources. It is to these ends the present invention is directed.

SUMMARY OF THE INVENTION

The invention provides new and improved methods and apparatus for software testing in an isolated and controlled software testing environment which improves software engineering productivity, increases product quality, and reduces the use of development computer resources.

In accordance with the invention, a method of software testing using a computer system having a memory is provided. The method comprising the steps of analyzing source code stored in the memory to produce analysis information that identifies external dependencies which are necessary to enable the source code to be tested in an isolated environment, generating automatically using the computer system in response to the analyzing step, complementary code including definitions of the external dependencies, and translating the source code and the complementary code to produce a machine-executable program for testing the source code.

In another aspect, the invention also provides an apparatus for software testing on a computer system having a memory comprising means for analyzing source code stored in the memory to produce analysis information identifying external dependencies which are necessary to allow the source code to be tested in an isolated environment, means for automatically generating in response to said analyzing step, complementary code including definitions of said external dependencies, means for translating said source code and said complementary code to produce a machine-executable program for testing, and means for executing said machine-executable program within a testing environment.

DETAILED DESCRIPTION OF PREFERRED EMBODIMENTS

This invention is particularly applicable to standalone software testing and will be described in that context. However, as will become apparent, the invention has greater utility.

Figure 1:
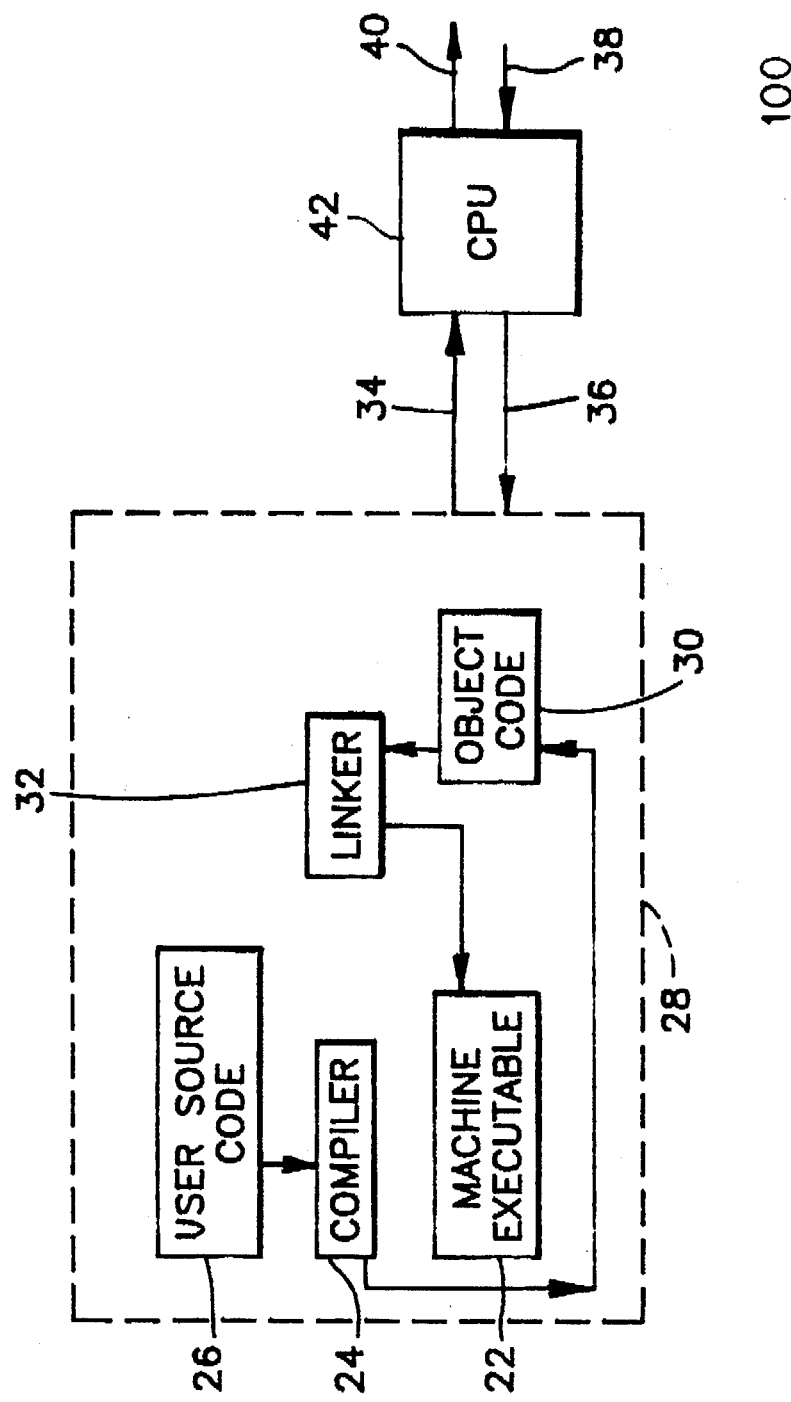
FIG. 1 is a simplified block diagram of a computer system which may embody the invention.

FIG. 1 illustrates a simplified computer system which may embody the invention. The computer system may include a memory 28, a central processing unit (CPU) 42, bus lines 34 and 36 which connect the memory and CPU, and input/output lines 38 and 40. Source code 26 may be stored in the memory. Additionally, a compiler 24 and linker 32 may be stored in the memory. The source code may be compiled by the compiler to produce object code 30 which is also stored in the memory. The linker may take as input one or more object code modules to produce as output a machine-executable computer program 22 which may also be stored in the memory. In machine readable form, the machine-executable program typically contains machine instructions to be executed by the CPU and data. The CPU reads in the machine-executable program from memory over bus 34 and executes the machine instructions to process the data.

The computer system may have other forms and include additional components other than as depicted in FIG. 1. For example, internal memory 28 may comprise primary memory, such as random access memory (RAM), and secondary storage, such as tapes and disks.

The compiler 24 may be a known type of language processor which translates source code 26 written in a given computer language into corresponding object code. Typical computer languages with which the invention may be used include "C", "COBOL", "Fortran", and other commercial and technical languages known to those skilled in the art. The source code is typically a text file which is in human readable form. It may comprise a software program typically including a set of multiple modules written in one or more computer languages.

The computer system of FIG. 1 may be used to perform the previously described process of standalone unit testing in an isolated testing environment with external dependencies identified and resolved. Specifically, unit testing may proceed in a controlled testing environment without requiring the presence of other untested software units allowing testing to focus on the software unit, and allowing problems encountered to be attributed to the software unit being tested.

Unit testing may involve providing test data and various inputs to simulate actual conditions under which the unit of software may operate. Test data is developed for testing a particular purpose or functionality of the software unit, such as having the software unit perform in accordance with certain performance criteria, or testing a range of input values for a certain source module. Additional test data may be developed for testing the error checking capabilities of the same software unit. A corrective action may be taken in response to unexpected test results. Corrective actions may include, for example, source code and test data modifications.

Unit testing may be followed by using the computer system to perform integration testing in which software units are incrementally combined until the complete software program is the resulting integrated machine-executable program being tested. Integration testing may involve the integration of data, source code, and test results. For example, the test data for the various software units integrated may be combined into an integrated test data suite.

As an example of unit testing, a software unit may be developed for a random number generator in which the software unit includes a random number generator function, and other functions which may be used by the random number generator function, for example, for error processing. A first set of test data may need to be developed to test the numeric values returned by the random number generator function for a range of possible valid numerical input values. A first set of test results from the first set of test data may be only numerical values which are compared to a set of expected or precalculated values for correctness. If a portion of the first set of test results includes incorrect or unexpected numeric return values, corrective action is taken to produce the correct or expected numeric results. A possible corrective action may be a source code modification. The corrected software unit may be retested with the same first set of test data. Upon receiving the correct results, testing may continue with the development of additional test data.

A second set of test data may be developed, for example, with the purpose of testing the error processing capabilities of the software unit for invalid input values for the random number generator function. A second set of test results corresponding to this second set of test data may include only textual error messages. These test results may be compared to a set of expected error messages, and a corrective action may be taken if the incorrect error messages are produced.

Typically, in order to produce a machine-executable program to test the random number generator software unit, for example, the software unit and any additional code required to complete unit testing must compile and link successfully. To accomplish this, all external dependencies of this software unit must be identified and resolved or the software may not compile and link without errors. For example, calls made from this software unit to another software unit must be identified. Typically, a placeholder function definition, or "dummy" function definition may be used for such "subroutine calls". The dummy function definitions are used rather than the other software routine definitions so that any errors which occur may be attributed to the software unit being tested without introducing other unknown factors into the software testing. If the software unit being tested is compiled and linked without the dummy function definition or the real function definition, compiler and linker errors may result. The use of the dummy function definition allows the software unit to compile and link without error producing a machine-executable program for unit testing allowing the software unit be tested as a self-contained unit. Such external dependencies may be determined through unsuccessful compiling and linking. Typically, once such external dependencies are identified, dummy function definitions may be manually coded to be used for the sole purpose of testing.

Integration testing, as in unit testing, typically requires producing a machine-executable program which is executed, and whose runtime output or results may be examined as a way to verify the correct functioning of the software being tested. Similarly, the external dependency problem of unit testing also exists for integration testing.

In integration testing, test data may be added for the purpose of testing the interaction of various software units. As an example of integration testing, the previously described random number generator software unit may be integrated with a second software unit which calls routines in the random number generator software unit. The random number generator software unit may consist of a random number generator routine and additional support routines. The test data for each of the two software units may be integrated into a larger test data suite to test the combined integrated software units. When integrating the two software units, calls from the second software unit to the random number generator function subroutine or function may also require additional testing. Test data may be added as part of integration testing for the purpose of testing those software units calling the random number generator software unit by adding test data which represents the varying input parameter values passed to the random number generator function in a typical call.

Using the foregoing standard testing methodology, certain problems and requirements of unit testing and integration testing can be identified. Specifically, an efficient method of determining and resolving external dependencies for a given set of software modules is needed for both unit testing and integration testing. The software to be tested may have external dependencies on other software which is not included in the set of modules comprising the software unit being tested. The other software is needed to allow a machine-executable program to be produced to enable runtime testing. Other software may include an object library containing code known to function correctly which is linked with the software to be tested to produce a machine-executable program. Other software may also include untested source code which comprises part of another software unit.

Externally dependencies that may pose problems in software testing may generally be placed into two classes. One class is an external dependency on stable or tested code whose definition does not reside in the software to be tested. This kind of external dependency does not create testing difficulties. An example of this class of external dependency is a routine call from the software being tested to a system library routine external to the software unit which is known to work properly. Typically, these external dependencies are resolved by including the actual definition of the called routine by, for example, linking in the object library containing the actual routine definition.

The second class of external dependencies is an external dependency on, for example, unstable, untested, or unwritten source code. As previously mentioned, an external dependency example of this class is a call out of the software being tested to a routine defined, for example, in an untested software unit. It is necessary to identify such dependencies and provide a solution to enable testing to complete without requiring, for example, the presence of the untested software. As previously mentioned, such external dependencies may be identified through compiling and linking errors. Typically, such dependencies may be inefficiently resolved by a time-consuming manual coding process to provide dummy function definitions that can be compiled and linked with the software to be tested. The invention avoids this inefficient process, as will be described below.

Once the dependency problem is addressed, a testing environment must be established which "holds" the given set of software modules and provides a means for testing the software modules. Because of the frequency with which testing-correction-retesting is required, efficiency in performing this test-correction-retesting is mandatory.

Common to both unit and integration testing is the problem of how to determine when testing is complete. One way of measuring the degree of testing completion is through statement coverage by determining which lines of source code of the software unit being tested have been executed, and through branch coverage by determining what code paths are executed for source code which has multiple code paths which may be executed. Typically, special tools exist which may provide such information as statement coverage and branch coverage. However, it is desirable to integrate this tool capability into the testing environment for efficiency and ease of use rather than have a separate tool to provide this functionality.

Also common to both unit and integration testing is the problem of ensuring that no regressions occur when a new test case is added, or a coding correction is made. It is the set of aforementioned problems, among others, which the present invention addresses.

Figure 2:
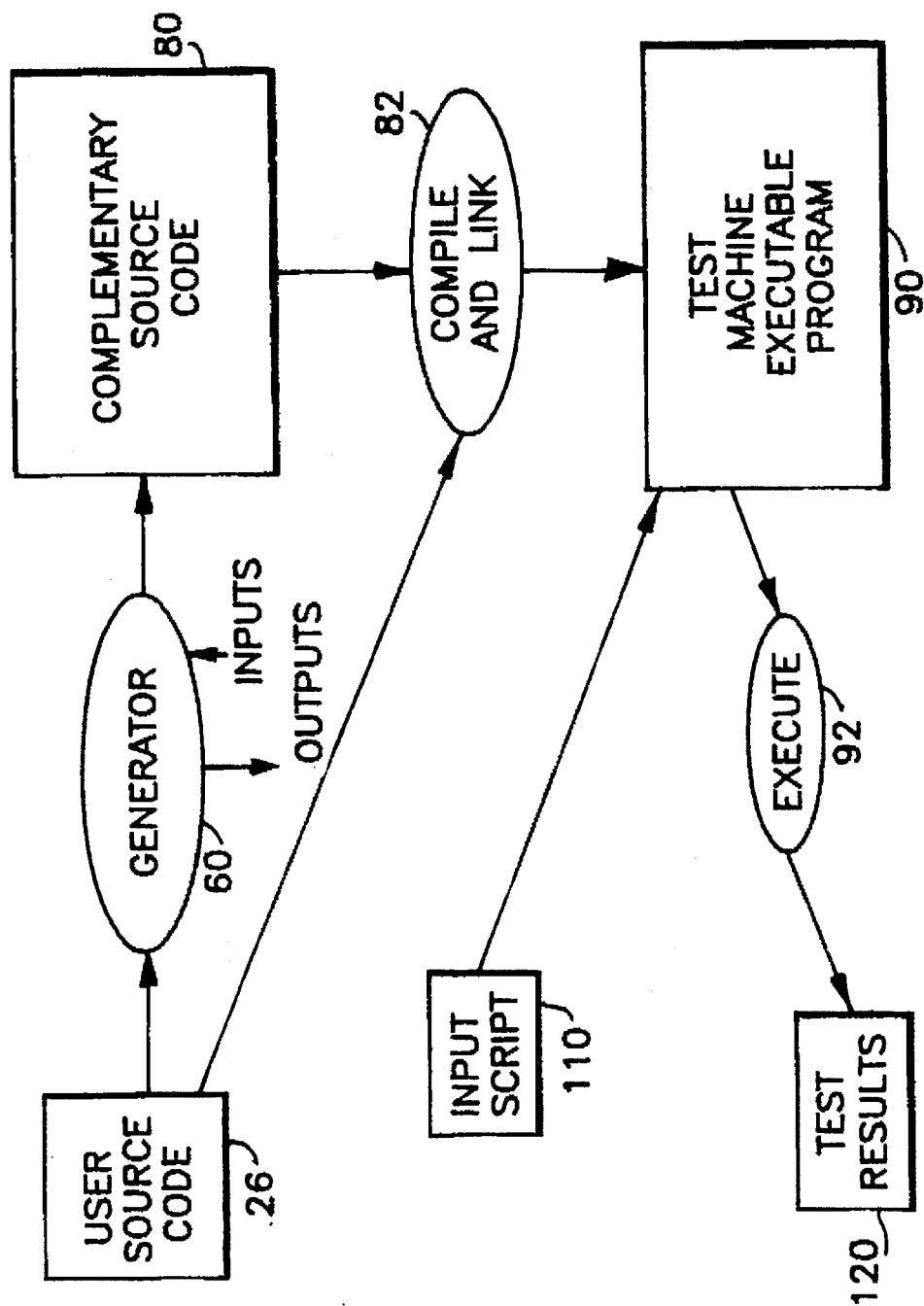
FIG. 2 is a block diagram showing a preferred method of generating and executing the standalone test system of the invention.

FIG. 2 is a block diagram showing a preferred method of generating and executing software for testing purposes. For a given set of user source code to be tested 26, a test machine-executable program 90 is generated using a generator 60 of the present invention. The present invention includes a generator 60 providing a method to automate the generation of the test machine-executable program and testing environment. The generator is a tool which may be implemented, for example, using software which may execute on the computer system of FIG. 1. Functionally, the generator tool implements a method performing an analysis of the user source code to be tested, and generates other complementary source code 80 enabling the user source code 26 to be tested. The test machine-executable program of the present invention provides an isolated and controlled software development testing environment with the ability to drive debugging and testing software, to measure testing completeness, and to verify correctness of future development and maintenance efforts.

The foregoing process described for software testing may be implemented for use on computer system, for example, as illustrated in FIG. 1. Various components or steps, such as the generator 60 of FIG. 2, may be implemented as a computer program, for example, which is compiled and linked to produce a machine-executable program containing machine instructions which are decoded and executed by a CPU.

In FIG. 2, user source code 26 is input to a generator 60 of the present invention. The generator, which may comprise code executing in the computer system of FIG. 1 as stated, produces as output complementary source code 80. The generator is described in greater detail in following text descriptions accompanying FIG. 3. The complementary source code produced by the generator "complements" the user source code and comprises source code which is necessary to enable production of a machine-executable program, as by compiling and linking, for the purpose of testing the user source code 26. For example, the complementary source code may include dummy routines generated to resolve external dependencies, source code which implements the runtime test environment commands, and the test system's main routine or control routine which is the main point of test system control. Various kinds of complementary source code are discussed in more detail below. The complementary source code and the user source code may be compiled and linked 82 to produce the test machine-executable program 90.

An input script 110 comprising test commands and test data for the particular software being tested, for example, is used to customize and to control the software testing and execution of the test machine-executable program. The test machine-executable program is then executed at 92 to produce the test results 120 of the test machine-executable program executed in accordance with the input script. These results may be recorded and compared to the results of executing different versions of the test machine-executable program 90. This is useful in development tasks such as regression testing.

Figure 3:
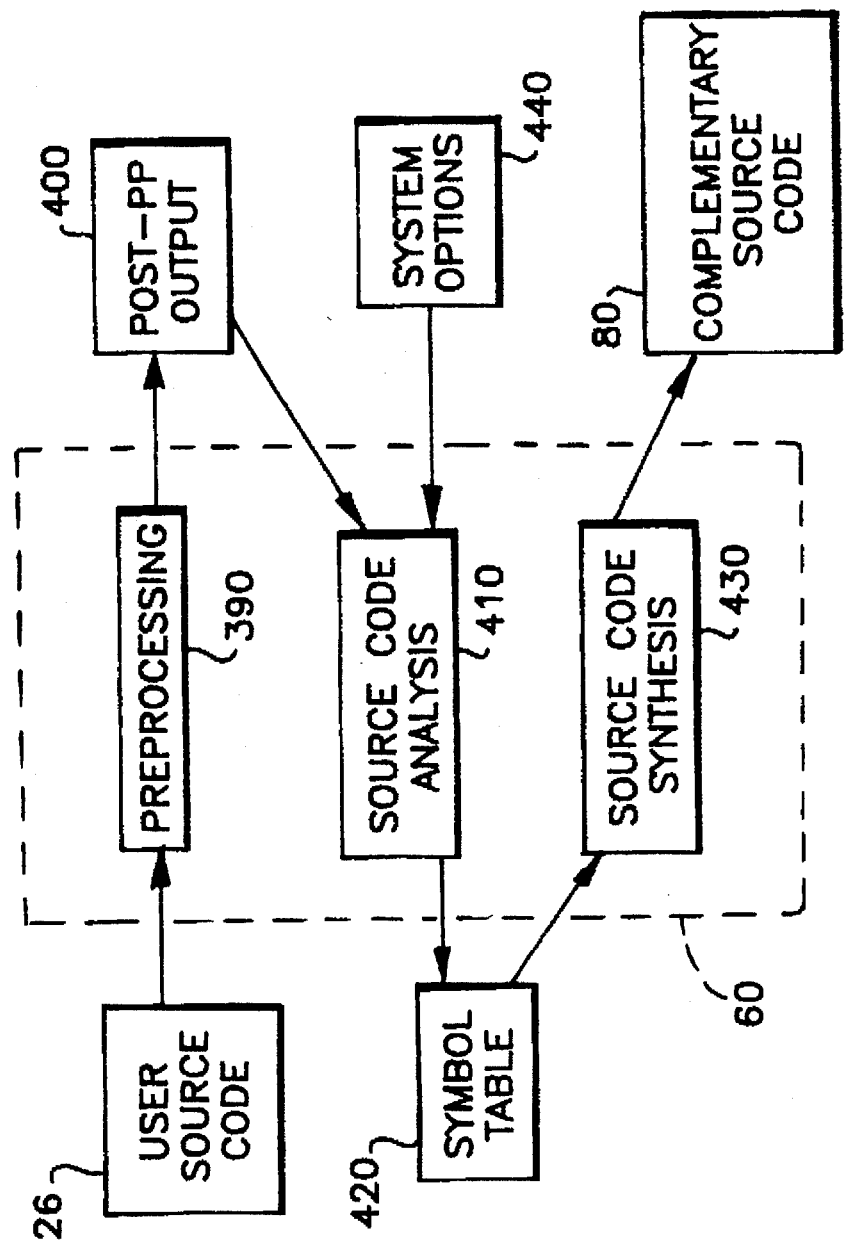
FIG. 3 is a block diagram showing a preferred method for automatically processing user source code to produce test system source code.

In the preferred embodiment, the generator may implement the method depicted in FIG. 3, with the user source code 26 as input and complementary source code 80 produced as final output. Other inputs and outputs are used and produced, respectively, by the steps of the generator in the preferred embodiment as shown in FIG. 3.

FIG. 3 illustrates a three step process performed by the generator which may be implemented using software for execution on a computer system as in FIG. 1 to produce the complementary source code 80.

The first preprocessing step 390 of the process performed by the generator 60 produces an expanded source file or post-preprocessor (post-pp) output file 400 containing, for example, the actual source lines which are to be compiled and executed. The purpose of this step is to obtain the expanded source code in the form needed by the source code analysis 410. The function of the preprocessing step is to evaluate any precompilation statements which may be contained in the user source code 26. The resulting evaluation of such statements may vary with each execution of the preprocessing step and may affect the actual source code which is input to a language processor or compiler. The post-pp output is representative of the source code which is input to a compiler or language processor, for example, with precompilation statements evaluated.

Some language processors, such as an ANSI (American National Standard Institute) compliant C compiler, include a preprocessing step which allows user source code to contain programming shorthands and conveniences, such as directives, macros, and conditional compilation statements, which are interpreted by a preprocessor phase of the language translator or compiler. The preprocessing step may be considered a pre-compilation phase for processing pre-compilation statements and directives contained within the user source code. The need for this step may be specifically dependent on the language, such as C, and the language processor, and may be omitted. The user source code 26 in the preferred embodiment may include pre-compilation statements and directives, such as code written in ANSI standard C with C preprocessor statements. The post-pp output 400 of the preprocessing step preferably includes a human-readable file. As it is known to those skilled in the art, many C compilers have a programming option, such as a command line option, which instructs the compiler to place the output of the preprocessing phase, for example, in human-readable form in a file on the computer system.

The foregoing preprocessing function may be implemented in code embodied within different programming tools or software utilities depending on the development environment.

For example, an ANSI compliant C compiler has a preprocessor which performs certain functions prior to compilation of the source code. Specific functions of the C preprocessor include macro processing and conditional compilation directives which may affect the text of the actual source line. One C preprocessor directive is the #if conditional. The preprocessor evaluates the preprocessor directive statement and may cause different versions of source code to be generated depending on the evaluation of that statement for this specific compilation. Thus, before the C source code may be analyzed, preprocessor statements, such as these, are evaluated by the C preprocessor since they affect the source code statements.

The second step 410 of the generator involves performing an analysis of the source code. It may have as inputs the post-pp file 400, if preprocessing is needed, otherwise the user source code 26, and a system options file 440. The system options file 440 is a mechanism for specifying options which may be used in the source code analysis, as will be discussed in more detail below. The post-pp file and system options file (if used) are processed in the source code analysis step 410 which creates a symbol table 420. The source code analysis step, which may comprise code executing in the computer system of FIG. 1, reads in the user source code 26 or the post-pp output file 400, and extracts program information required for generating the complementary source code 80. Analysis of user source code is an automated information gathering process implemented, for example, using a scripting language or programming tool to perform string searches and matches for keywords, routine names, and type information, and to tabulate results of such searches. The symbol table may include these results and information regarding the user source code 26 such as function signatures and type information, source file names, a list of defined functions or routines, a list of routines which are called but not defined within the user source code (functions to be "stubbed" with "dummy" routines), and information extracted from the system options file needed to produce a portion of the generated complementary source code 80. The symbol table functionally contains information which may be needed to complete the next source code synthesis step 430, as will be discussed. The symbol table may be written in a form convenient for the source code synthesis step 430, such as a text file residing in the computer system of FIG. 1. A symbol table may not be needed at all, for example, if the analysis information is passed directly to the source code synthesis step.

A function or routine signature information may exist for a routine called from the software unit, or for a routine definition comprising part of a user source code. Routine signature information includes, for example, the number of parameters, parameter type information, and function return value type information such as word size or string size in bytes.

The analysis step 410 may be implemented using a command script which performs an automated source code analysis. Specifically, the command script may be written in the "Bourne" shell command scripting language making use of a version of the "Unix" tool "awk" to perform, for example, string searches and matches. The command script may be a text file containing script commands to automate the information extracted by performing a source code analysis. The script commands may include invocation of the "awk" utility which performs string searches and matches on the user source code 26 to identify, for example, routines called from the user source code by searching for specific strings such as "extern" or "CALL" depending on the user source code contents. The "Bourne" shell command script language and the "awk" tool are well-known features and utilities of a typical "Unix" operating system and its programming environment. A preferred embodiment may include an improved version of the "awk" utility which performs string searches for strings which may span more than one line, and provides for string substitution.

Following source code analysis, the information contained in the symbol table 420 is input to the source code synthesis step 430 which automates producing the complementary source code 80. The source code synthesis uses the information extracted from the analysis of the user source code to generate complementary source code necessary to produce a test machine-executable program. The source code synthesis tool may be implemented using a command script, or using a software program written in a computer programming language, such as C, that is executed on the computer system of FIG. 1.

As an example, the list of routines identified as external dependencies and their associated routine signatures may be stored in the symbol table as a result of the source code analysis 410 by searching for keywords, such as "extern" and tabulating information, such as parameter type information associated with a called routine. The source code synthesis may also be a implemented as a C program which reads the input file. The input file may be organized in various ways so that the C program can recognize the list of called routines (external dependencies) and their corresponding signature information which require dummy routine definitions. Such an input file may be organized in a position-oriented format which the C program can interpret, or may contain keywords which the C program recognizes through string searches, for example, signifying the routine names and corresponding routine signatures. The C program may generate complementary code comprising, for example, dummy routine definitions based on the information obtained from source code analysis step 410.

It should be noted that other ways exist which automate producing the complementary source code 80 given the user source code 26. These may depend on the user source code language, the compiler or language processor, and the development environment available for use with operating systems such as the "Unix" operating system or the "Open-VMS" operating system by Digital Equipment Corporation.

Figure 4:
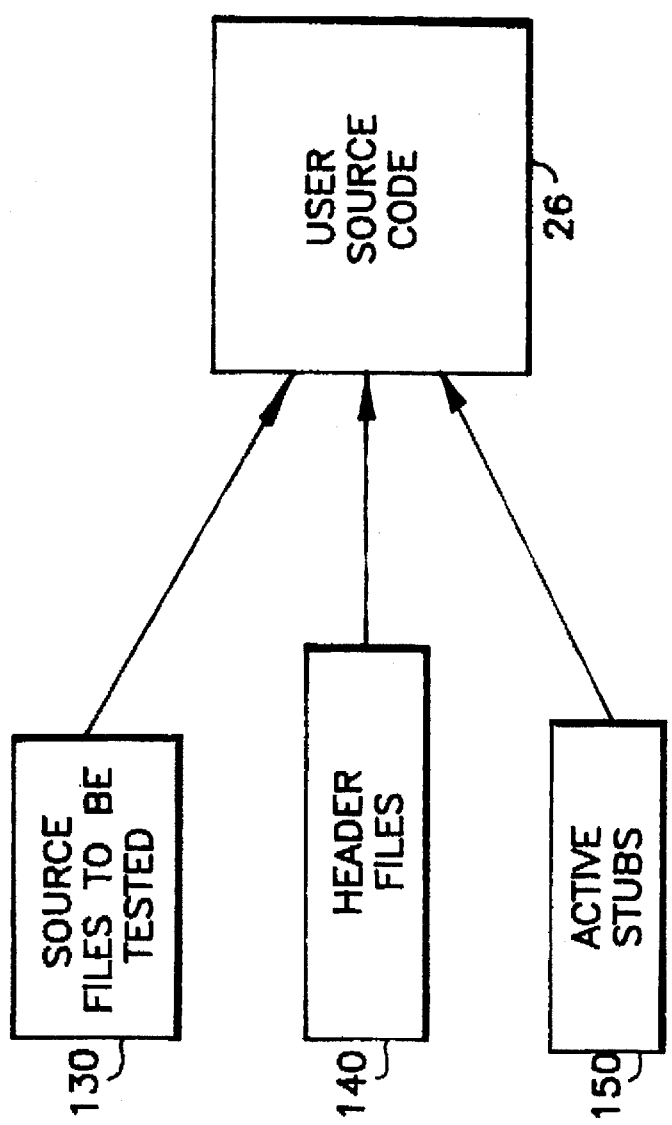
FIG. 4 is a block diagram illustrating constituents of the user source code.

FIG. 4 depicts in greater detail examples of component parts of user source code 26 input to the generator 60 of the present invention. Typically, such user source code may include the source code to be executed and tested 130, such as coded routines or functions, definition or header files 140, and any "active" stubs 150, which will be explained in text which follows. The definition or header files functionally provide complete interface type definitions of the routines and respective parameters contained in the source files to be tested 130 as required by the source code analysis 410 to place information necessary for source code synthesis 430 into the symbol table 420.

If the user source code 26 is written in the C programming language, source files may include source files (.c files)

containing routine bodies of code, and header files (.h files) containing complete interface or prototype definitions of routines. The source files to be tested 130 and active stubs 150 may be routine bodies of code, and the header files 140 may provide interface definitions for these.

In the following example, file "m.c" is a C source file or module which may contain the source code which comprises two routine definitions, "m1" and "m2", to be unit tested with the following C function prototype definitions:

```
int m1(void);

float m2(int p1, float p2);
```

Module "m.c" may also contain external calls out of the module to C language routines "s1" and "s2" which are defined in some module other than the calling module "m.c" having the following function prototype definitions:

```
void s1(int i1);

char *s2(char* c1);
```

Source file "m.h" is a header file containing C language interface descriptions of the routines defined in the module "m.c". Additionally, "m.h" contains interface descriptions of routines "s1" and "s2". Calls to "s1" and "s2" are dependencies of module "m.c". Given the above prototypes for "m1", "m2", "s1", and "s2", header file "m.h" may contain the following definitions:

```
int m1(void);

float m2(int p1, float p2);

extern void s1(int i1);

extern char *s2(char *c1);
```

To allow unit testing to proceed, the dependencies of the unit to be tested, such as calls to 's1' and 's2', must be determined. Further, since dependencies may change frequently, an efficient way of determining and resolving external dependencies is desirable.

External dependencies of the software being tested may be resolved by using active stubs and passive stubs. An example of a passive stub is an external routine called from the set of software modules to be tested which is a simple or passive call. This simple level of control may be achieved via input script commands. For example, a passive function may only require error behavior and return value control. The generator automatically detects and provides stubbed function definitions for passive stubs. Active stubs, which are described below, are user-provided stubs.

As previously discussed, there are generally two kinds of external dependencies for a given software unit. One kind is an external dependency on stable or tested code, such as a tested system library routine. A second kind is an external dependency on untested and unstable code, or unwritten code. An example is an untested routine which is part of another untested software unit. One function of the generator is to automate the process of generating "dummy" routines required to resolve external dependencies. This may be accomplished by implementing the generator 60 such that it does not generate "dummy" routines or stubs for those external dependencies of the former kind, only the latter kind. Rather, the external dependencies on tested code may be overlooked by the generator since they do not pose a testing problem or difficulty. This allows a call to be made to the actual external library routine, for example, since stub generation for these routines for testing purposes may be unnecessary. The generator may automatically perform this selective passive stub generation of external dependencies if a filter list of known routines is provided as an input to the generator. For example, this list may be placed in the system options file 440 with an editor and read as an additional input by the generator 60 to suppress the automated passive stub generation for the listed routines. As another example, the generator may detect calls to stable external library routines by examining a post-pp file. A C preprocessing step may result in the post-pp file containing information such as in which library a called routine is contained. The generator may selectively suppress stub generation for routines contained within specific libraries.

In the earlier example, the C source files mentioned may exist in a "Unix" development environment. An ANSI-compliant C compiler is invoked by issuing a command with options, for example, to cause the C compiler's preprocessor to process the user source code 26 and produce a post-pp output text file 400. A second text file created with an editor may contain "Bourne" shell script commands to perform the necessary source code analysis 410. The script commands may include invoking the modified version of the "awk" utility previously described to search the user source code for specific keywords, such as "extern", to determine a list of routines requiring dummy routine definitions. Such a list of routines may be included in the symbol table. When such keywords are matched, other information, such as routine signature information, may be extracted and also placed in the symbol table 420. For example, the characters "(" and ")" may denote the beginning and end of a declared C routine parameter list. By searching for these two characters and further examining the information between them, a routine's signature may be derived.

The generator may also provide other ways of obtaining signature information. For example, parameter types may be determined implicitly, by examining the types of actual arguments made in routine calls and storing information obtained by examining in the symbol table, rather than explicitly through examining function declarations. Determining signature information, such as parameter types, implicitly allows less stringent definitions and may be used in combination with explicit declarations to provide a flexible way to obtain function signature information as needed by the user source code and generator implementation.

The symbol table may be a text file with a predefined format. For example, a sample general format of a symbol table may be one physical line in the file per symbol entry in which the general format of the line is: "keyword/ information" A "keyword" may be a character string signifying a specific type of symbol entry, the "/" character is a field delimiter or separator, and "information" is that which defines the type of symbol denoted by the specified keyword. For routines requiring dummy function definitions such as the previously mentioned routine "s1", a formatted entry with keywords in the symbol table may look like:

psig/void/s1/int/i1 in which "psig" is a keyword signifying that this line contains information about a routine requiring dummy routine definitions. Thus, a semantic meaning is imparted to the line containing symbol information throught the use of keywords. The character "/" is a delimiter dividing the various fields of the line. For "psig" symbol table entries, the "information" expected is a series of one or more "type/name" strings in which the first "type/name" string signifies the routine return value type and routine name followed by any parameter type and parameter name pairs. In the example above, the routine name is "s1" and it returns a C "void" type. The routine has one formal parameter "i1" of type "int".

For efficiency, the invention may further eliminate routines from this list of routines requiring dummy routine definitions by searching the user source code for actual calls made to routines contained in the list. It is possible for a user to declare a routine and no call may actually be made to the routine. If no call is actually made to the routine, it may not be necessary to generate code for a dummy routine definition. Depending on the tools used in producing the test machine-executable program 90, such as a compiler and linker, a dummy routine may not be needed to successfully complete compilation and linking.

In this example, the symbol table may be a formatted text file which uses keywords to signify various types of symbol table entries, such as routines requiring dummy routine definitions, and a field delimiter character, such as "/". This file type and organization chosen may depend upon the tools used. In this case, such a file is a convenient form and type to use in conjunction with a script command file and the version of the "awk" string search utility. File type and organization may vary with specific implementations of the generator 60.

The symbol table information extracted from the source code analysis 410 is an input to the source code synthesis 430 which may be implemented using a third text file containing "Bourne" shell script commands. This third text file may be created with an editor and contain commands invoking a string search utility, such as a modified version of the "awk" utility previously described, to locate keywords or characters in the symbol table. For example, using the symbol table format and sample entry previously described, the third text file may include script commands invoking the "awk" utility to locate keywords by extracting the character string up to the first delimiter. Then, the script may match the extracted string with various expected keywords and take actions in response to the match determined. The extracted string "psig" may be compared to expected keywords using script commands such as a comparative "if" statement. When a conditional "if" statement evaluates to true, such as: if(extracted-string=='psig')", various actions may be taken in response to this determination. For example, after determining the extracted string is the keyword "psig", a series of script commands may be executed to extract the routine name and return value type, and parameter name and type information. These script commands may similarly invoke the "awk" utility to perform string matching and extract information from the symbol table needed in generating the dummy routine definitions comprising the generated complementary source code 80. For the above symbol table entry for C routine "s1", the following dummy routine may be generated by the source code synthesis 430:

```
void s1(int i)
{
    /** COMMENT IN C—generated dummy routine **/
    return;
};
```

This is an automatic way of generating dummy routine definitions comprising the complementary source code 80 for the first general category of external dependencies of the present invention, passive stubs.

An example of the second general category of external dependencies, i.e., an example of an active stub, is an externally called function or routine which requires more user intervention than simply providing a means for supplying input data, processing output data, and resolving a reference through the use of a placeholder function definition for testing purposes. For example, an active stub may be one whose value to be returned involves complex calculations such as a routine called to generate a series of random numbers, or a real memory address to emulate the active stub call. The generator processes active stubs like driven functions to be tested since the developer provides a definition. Active stub routine definitions are source files input to the invention and are analogous, to the invention, to a driven function to be unit tested. Generally, a driven function or routine may defined as one whose routine definition or defining body of code comprises a portion of one of the software units which is a focus of the testing efforts. A driven function is tested by driving or providing the function with data inputs, for example, to test its runtime functional correctness.

Other uses of an active stub may include providing an alternate definition for a called external library function which has unwanted side effects in the testing environment. For example, a call may be made from the software unit being tested to a stable, externally defined library function which is a graphics routine that draws images on a terminal screen. The calculations by this routine may be complex and time consuming and deemed not essential for certain testing purposes. By providing an active stub definition for this graphics routine which verifies that a call was successful, no actual drawing or complex calculations are performed during testing.

When calling a routine, performing runtime data validation on values, such as incoming and outgoing parameter values, may be needed in testing. Generally, there may be other conditions or values in addition to parameter values which need to be verified at the beginning or ending of an executed routine. Pre-conditions are those conditions which are evaluated and checked at runtime at the beginning of a called routine. Similarly, post-conditions are those conditions evaluated and checked at runtime prior to returning from a called routine.

To implement pre-conditions and post-conditions, it is necessary to define these conditions and to associate them with their corresponding routine. The generator performs this function. It recognizes such pre-condition and post-condition definitions, and associates them with the correct corresponding routine using string searching and matching, for example. Pre-conditions and post-conditions may be specified in the header files 140 as expressions which are evaluated at runtime to perform data validation. For example, a pre-conditions may be defined as a C static character string having the variable name end with the suffix "Pre". Similarly, post-conditions may be defined by having the C string variable end with the suffix "Post". The generator may detect such pre-condition and post-condition definitions as through searching for the suffixes "Post" and "Pre", associating a pre-condition or post-condition with a corresponding routine by queueing or storing the condition, and associating the condition with the next potential passive stub declaration encountered in the header file. The next potential passive stub is the next subsequent "extern" function declared in the header file.

For example, the following may be included in a header file 140 to define a pre-condition and a post-condition, and associate the conditions with a routine which is a passive stub declaration:

```
static char *func1Pre="a<=*b+1"; /*PRE-CONDITION*/ static char *func1Post="jigRet!=(char *)0"; /*POST-CONDITION
*/ extern signed int func1(const int a, char *b);
```

The generator recognizes that 'a<=*b+1' is a pre-condition, and 'jigRet != (char *)0' is a post-condition. The generator may perform this recognition by, for example, searching for the strings 'Pre' and 'Post' for pre-condition definitions and post-condition definitions, respectively, as it processes the user source code. Similarly, the generator may determine that both the pre-condition and post-condition are associated with the routine 'func1', for example, by searching for the next subsequent "extern" function declared in the header file.

There are other ways of defining pre-conditions and post-conditions, and other means of associating such conditions with a specific routine or function which are dependent on the chosen environment and implementation of the generator which may be used. Note that the means of pre-condition and post-condition definition and association with a specific routine may be a desirable feature for certain testing purposes, as previously mentioned, such as performing data validation.

In generating the body of code for a passive stub, pre-conditions associated with a routine are evaluated and checked at the beginning of a routine call. Similarly, post-conditions are evaluated and checked prior to returning from a routine call. Additionally, pre-condition or post-condition checking may be accomplished manually by including the pre-condition or post-condition code in the active stubs. The generator produces code necessary to perform runtime checking of the pre-conditions and post-conditions associated with a passive stub routine. For example, the code generated for a pre-condition may be placed at the beginning of the routine body and may be of the conceptual form:

```
if(pre-condition is FALSE) then {perform some action};
```

Similarly, the code generated for a post-condition may be placed immediately prior to a routine return or exit and may be of the conceptual form:

```
if(post-condition is FALSE) then {perform some action};
```

Although the generator provides for automatic code generation of pre-conditions and post-conditions in passive stubs, this function may also be provided for active stubs or generally for any routine or function by providing a generic mechanism for indicating that the generator 60 should generate code to test for any specified condition. For example, the generator may have a defined or reserved command, or a defined pre-processor macro. The name of the macro or command is included in a routine's body of code where the condition-checking code should be placed.

Besides adding pre-condition and post-conditions to the user source code, the generator provides more than one method in which users may specify data types as "opaque". Functionally, an opaque data type is one which may not have a detailed definition in the header files. A detailed definition may not be required, for example, if a unit being tested does not need to have a detailed description of a data item being accessed. A record is an example. A record may have numerous fields contained within its definition. However, if the unit being tested does not access the fields within the record, the unit may be tested without the detailed record field descriptions.

One implicit way which a type may be defined as opaque is inherent in the C language structure or 'struct' declaration. The C struct may be analogous to a record, and components within a struct declaration may be analogous to fields within a record. For the software unit to be tested, the details of a C 'struct' may not be necessary. For example, the unit may not access the fields of the struct. The developer may define such types and variables as opaque. An example may be C definitions as specified:

```
void *opaque_1;

extern struct opaque_2 *func1(int p1);
```

Variable 'opaque_1' is declared as a pointer to an unknown type which can point to anything. Similarly, 'opaque_2' may be an example of a bodiless struct definition which may appear in a header file 140 without visible C struct member definitions. Thus, the details of the struct type 'opaque_2' and the details of what variable 'opaque_1' point to may be hidden, or opaque, to the test system. Note that limiting the detail of a struct definition may have the benefit of reducing the amount of code generated by the generator, as will be discussed further.

This implicit method of declaring a type as opaque is specific to the C language. Other programming languages, specific implementations of these languages, or tools particular to the chosen development environment or generator implementation may provide other ways of allowing the generator 60 to generate complementary source code 80 without requiring complete, detailed data definitions. Additionally, there may be no implicit methods for declaring an opaque type for a chosen implementation of the generator.

A second way in which an opaque type may be specified is in the options file 440. The options file may contain explicit commands indicating to the generator 60 which types are opaque to the test system. For example, an options file may contain the following indicating to the generator that C struct type 'opaque_2' is opaque:

```
#jig/opaque/struct opaque_2
```

The benefit of defining a type as opaque, either implicitly with C specific declarations, or explicitly in the options file, is that the generator does not require a detailed data definition to complete its source code analysis and source code synthesis. Types defined as opaque indicate to the generator 60 that complete detailed data definitions are not required in testing. Additionally, the amount of generated source code 80 is typically less when there are fewer detailed data definitions because the generator 60 does not have to generate the additional source code, for example, as part of the debugging or testing environment providing the capability of printing out values of the various fields of a C structure.

Information regarding what types are opaque may be extracted from the user source code 26, or the system options file 440 by the source code analysis 410, and may be included in the symbol table 420. The source code synthesis 430 may use this information so as to decrease the generated source code 80 needed to execute test environment commands as required by the tester or developer.

As comprising the complementary source code 80, the source code synthesis may also generate: source code necessary to implement test environment commands, a main routine or control routine to control the dispatching to the proper portions of code for an entered test environment command, and various support routines to provide a testing environment, such as code to interpret the entered commands or perform dynamic memory allocation and management. Generally, test environment commands may be executed interactively or in a batch processing mode using, for example, an input script. Interactively, a user may enter commands, receive some response at her terminal, for example, and then continue to enter more commands. With an input script, for example, a batch or series of test environment commands may be provided in a text file. The test system may execute the series of commands providing output corresponding to the series of commands. Typically, an input script may be used to record the commands with the intent of reusing the same series of commands. The output from an input script may also be recorded with the intent of comparing the testing output or test results for subsequent test system executions.

The generated code for some test environment commands may vary with type information provided in the symbol table. For example, there may be a PRINT command in the testing environment which prints out the values of program variables. A structure or record may be defined which has numerous fields including some fields which are themselves records. In testing, the PRINT command may be executed to print out the entire record as well as a single field of the record. If such a record type is opaque, the generator may produce less source code since code is not needed to PRINT the structure or record field values.

Testing environment commands may also provide functionality such as tracing which automatically prints out the name of a called routine, its parameter values, and any routine return values.

Additionally, depending on implementation, it is possible to have portions of source code necessary to implement test environment commands, and the source code for a test system control routine stored in an object library, for example, rather than re-generating such source code each time the generator is used.

The invention may also provide support for test system variables and coverage analysis. Support for test system variables includes a means of defining a variable during test system execution for the sole purpose of testing. Additionally, it is desirable that the names for such variables do not impede or conflict with the programming variables. Test system variables may facilitate the communication of test data used to drive functions, and to receive return values from functions.

The invention may provide a way for defining test system variables in the testing environment with a test environment command, for example, with the command format: "DECLARE type variable-name" wherein "type" may be a programming variable type previously defined in the user source code 26, and "variable-name" is the name by which the test system variable of this type may be referenced in future test environment commands. For example, assuming the defined type "type1", the test environment command "DECLARE type1 V1" declares a test environment variable V1. Storage may be dynamically allocated for the variable V1 when its declaration is encountered during the execution of the test environment DECLARE command, for example.

For such dynamic storage allocation, a dynamic memory management scheme may be used for performance benefits. For example, a large portion of storage may be initially allocated dynamically at runtime by calling an operating system or library routine. The main program then allocates a portion of this initial allocation each time a test system variable is declared until all the initial allocation is consumed. At this point, an additional large portion of memory may be allocated to the test system and is similarly divided up for use as test system variables are declared. Such a memory management scheme does not have to be used but may be more efficient as opposed to the computing overhead of performing a system or library routine call each time a portion of dynamic memory needs to be allocated, for example, with each declaration of a new test environment variable.

An example use of a test system variable may be to receive a return value from a routine being tested, and print out its value. The commands to declare and print the return value may be part of an input script. The result of executing the input script may be recorded as output data and stored, for example, in a file for comparing subsequent output data.

The invention may include the ability to drive functions or routines to be tested. To drive a function is to provide values, for example, for function or routine parameters. It may also include retaining or capturing a return value or output parameters from such a function for a given set of input parameters. For example, the invention may implement the following test system environment command to accomplish this:

"CALL func(parameter-value-list) VALUE var1 wherein "func" is the name of the function being tested in this call, "parameter-value-list" is a list of values supplied as function parameter values for this call, and "var1" is a declared test system environment variable in which the return value of the function call is placed.

The invention may also include a mechanism for controlling stubbed functions for which the generator automatically generates code. For example, the invention may implement the following test system environment command to provide this functionality: "LOAD func VALUE val" wherein "func" is the name of the stubbed functions, and "val" is the value which the stubbed function is to return. Data values which emulate return values of the stubbed functions may be specified by the tester or developer in the test environment through test environment commands. The runtime behavior is that the stubbed function keeps returning this value until a new data value is specified via another LOAD command for that function.

An important advantage of the invention is the ability to queue emulated values to be returned by a stubbed function. This may be accomplished through the use of several successive LOAD commands. This may be useful, for example, when a single call to a driven function to be tested results in several calls to a stubbed function. Specifically, the queue behavior may be achieved through issuing a series of consecutive LOAD commands which queues several return values for a stubbed function. Each time the stubbed function is called, it returns the next value which has been placed in the value queue. When the last value is reached, the stubbed function keeps returning this value until a new value is specified via another LOAD command. This behavior model is consistent with the previously described behavior of a single LOAD command.

As previously discussed, a problem in testing is determining when testing is sufficient or complete. This may be accomplished through determining relevant metrics by which testing completeness may be measured or quantified. A related but separate problem encountered after choosing such metrics is determining an efficient method for obtaining these metrics. One metric which may be used in determining testing completeness is measuring the breadth coverage of source statement execution for a given set of tests or test data through the use of an execution profiling tool which may provide statement coverage and branch coverage information.

Software tools and utilities exist which may provide information on testing completeness using various metrics and methods for obtaining the metrics. However, an efficient method for measuring testing completeness and providing this information to the developer may be integrated into a software testing tool and testing environment. For example, a software unit to be tested may comprise C source language containing conditional statements, such as if-statements and switch statements, which may have multiple execution paths possible dependent upon the evaluation results of a condition at the beginning of the statement. The test machine-executable program 90 may record the code path taken upon evaluation of a conditional statement. Testing environment commands may provide the evaluation results and the code path executed based on these results. For example, the testing environment command "PRINT COVERAGE if-statement" may cause the test system to record in an output file all the evaluated if-statement conditions and the corresponding source statements executed thus far in testing.

Integrating the foregoing functionality as part of a single aggregate software testing method affords many advantages. One advantage is that alternative methods to acquire equivalent testing functionality may require the use of multiple tools to complete testing, for example, or may require tool integration. Thus, alternative methods may require knowledge of how to operate and interpret results for multiple tools as opposed to a single tool. Additional problems dependent on the number, types and vendors of various tools, may be encountered if tool integration is attempted. Use of an integrated testing tool enables test results to be placed into a single output file, for example, as opposed to several different sets of test results making interpretation of test results easier and more efficient. Further, the ability to produce a single test results file provides an efficient and easy way to perform regression testing and analysis through comparison of complete sets of test results for subsequent test system executions, and to establish testing benchmarks.

From the foregoing, the numerous advantages, flexibility, and wide applicability of the invention to software testing and debugging may be seen. The invention is also applicable in software maintenance activities, such as "bug" fixes, and in software feature development, as in a new release of a product containing additional functionality over a prior product version.

The foregoing software unit development and corresponding testing methodology is illustrative of one common method of software development and testing. The testing problems associated with this method are common to other software development and corresponding testing methodologies, and the invention is applicable to these also.

While a particular embodiment of the invention has been disclosed, it will be appreciated by those skilled in the art that different modifications are possible and are within the true scope and spirit of the invention as defined in the claims set forth below.

What is claimed is:

1. A method of software testing using a computer system having a memory, said method comprising the steps of:

analyzing source code stored in the memory to produce analysis information identifying external dependencies which are needed for testing the source code in an isolated environment, said analysis information including a list of external routines called from said source code and not defined in said source code; and automatically generating, in response to said analyzing step, complementary code including definitions resolving said external dependencies.

2. The method of claim 1 further comprising the step of translating said source code and said complementary code to produce a machine-executable program for testing said source code, and wherein said analyzing step comprises producing a symbol table containing said analysis information, said analysis information including routine signature information, variable typing information, and another list of driven routines.

3. The method of claim 2, wherein said complementary code includes source code for providing a test system environment enabling execution of test system environment commands.

4. The method of claim 3 further comprising executing the machine-executable program using said test environment commands and using data to test runtime execution of said source code.

5. The method of claim 4, wherein said test environment commands are contained in a recorded input script for subsequent executions of said machine-executable program.

6. The method of claim 4, wherein said test system environment commands are issued interactively.

7. The method of claim 4, wherein said test environment commands include commands defining test variables used to communicate data between a plurality of routines during execution of said machine-executable program.

8. The method of claim 4, wherein said test environment commands include commands for queueing values to a routine for successive invocations of such routine.

9. The method of claim 4 further comprising recording test results from executing said machine-executable program in accordance with issued test environment commands to establish a benchmark test result for comparison to other test results from subsequent executions of another machine-executable program.

10. The method of claim 9 further comprising comparing the benchmark test result to a subsequent test result to determine if the subsequent test result is different from the benchmark test result, and, if different taking a corrective action based on the difference.

11. The method of claim 10 wherein said corrective action includes one of modifying said source code, or modifying said test environment commands.

12. The method of claim 2, wherein said complementary code includes source code which monitors the execution of source code statements contained in said source code to provide testing coverage analysis information.

13. The method of claim 12, wherein said machine-executable program includes a testing environment with coverage commands for accessing said testing coverage analysis information, and wherein said complementary code produced in said generating step includes source code to support the execution of said coverage commands.

14. The method of claim 2, wherein other source code is integrated with said source code to produce a combined source code, and wherein said analyzing, generating, and translating steps are performed using said combined source code.

15. The method of claim 1, wherein said generating step comprises using said analysis information contained in said symbol table to provide passive stub routine definitions for routines contained in said list of external routines.

16. The method of claim 1, wherein said source code includes interface description files containing information describing routines defined in the source code, and containing information describing externally defined routines which are called from said source code and not defined within said source code.

17. The method of claim 16, wherein said information contained in said interface description files comprises type information for routine parameters, and routine return value information describing said externally defined routines.

18. The method of claim 1 further comprising storing test system options in a system options file and wherein said analyzing uses said test system options to produce said analysis information.

19. The method of claim 18, wherein said system options file includes information that identifies a complex variable type as opaque to signify that a limited description of said complex variable type is contained in said source code.

20. The method of claim 1, wherein said source code includes pre-conditions and post-conditions defining values for performing runtime verification of routine parameters at the beginning of a routine call, and wherein said generating includes generating said complementary code to perform the runtime verification of said pre-conditions.

21. The method of claim 1, wherein said source code includes post-conditions defining values for performing runtime verification of routine return values and routine parameters prior to returning from the called routine, and wherein said generating includes generating said complementary code to perform the runtime verification of said post-conditions.

22. The method of claim 1, wherein said source code includes a first routine to be tested and a second routine which is an active stub routine definition functioning as a placeholder routine definition, said second routine called from said first routine.

23. The method of claim 1, wherein said source code contains preprocessor source statements, and the method further includes, prior to the analyzing step, a preprocessing step which evaluates the preprocessor source statements, and produces a post-preprocessing file containing expanded source code resulting from the evaluation of said preprocessor source statements, and wherein said post-preprocessing file is used in said analyzing step to produce said analysis information.

24. The method of claim 1 further comprising the step of translating said source code and using said complementary code to produce a machine-executable program for testing said source code.

25. An apparatus for software testing in a computer system having a memory comprising:

means for analyzing source code stored in the memory to produce analysis information identifying external dependencies which are necessary to allow the source code to be tested in an isolated environment, said analysis information including a list of external routines that are called from said source code and not defined in said source code and comprise said external dependencies; and means, coupled to said analyzing means, for automatically generating complementary code including definitions resolving said external dependencies comprising said external routines contained in said list;

means for translating said source code and said complementary code to produce a machine-executable program for testing; and means for executing said machine-executable program within a testing environment.

26. The apparatus of claim 25, wherein said testing environment includes means for providing a runtime testing environment with testing environment commands to examine routine information and test results and to provide test data to routines.

27. An apparatus for software testing in a computer system having a memory comprising:

means for analyzing source code stored in the memory to produce analysis information identifying external dependencies which are necessary to allow the source code to be tested in an isolated environment, said analysis information including a list of external routines that are called from said source code and not defined in said source code and comprise said external dependencies; and means, coupled to said analyzing means, for automatically generating complementary code including definitions resolving said external dependencies comprising said external routines contained in said list.

28. The apparatus of claim 27 further comprising:

means for translating said source code and for using said complementary code to provide a machine-executable program for testing.

29. The apparatus of claim 28, wherein, prior to using said complementary code, said means for translating translates said complementary code, and the apparatus further comprises:

means for executing said machine-executable program within a testing environment.

* * * * *